United States Patent [19]

Vieler

[11] Patent Number: 5,127,761
[45] Date of Patent: Jul. 7, 1992

[54] DEVICE FOR SEPARABLY COUPLING PROFILED MEMBERS

[75] Inventor: Gerd Vieler, Iserlohn, Fed. Rep. of Germany

[73] Assignee: Gerd und Bernd Vieler KG., Iserlohn, Fed. Rep. of Germany

[21] Appl. No.: 562,482

[22] Filed: Aug. 3, 1990

[30] Foreign Application Priority Data

Aug. 11, 1989 [DE] Fed. Rep. of Germany ....... 8912297
Aug. 24, 1989 [DE] Fed. Rep. of Germany ....... 3927979

[51] Int. Cl.$^5$ ................................................ F16B 9/02
[52] U.S. Cl. .................................. 403/252; 403/255; 403/254
[58] Field of Search ............... 403/255, 254, 253, 252, 403/187, 256

[56] References Cited

U.S. PATENT DOCUMENTS 4,345,849  8/1982  Stenemann ........................... 403/252
4,799,819  1/1989  Swoboda ............................. 403/252
4,974,987 12/1990  Smock ............................. 403/255 X

FOREIGN PATENT DOCUMENTS 87206373  2/1988  China .
2239370  4/1981  Fed. Rep. of Germany .
3153232  3/1986  Fed. Rep. of Germany .

Primary Examiner—Andrew V. Kundrat
Attorney, Agent, or Firm—Peter K. Kontler

[57] ABSTRACT

A connector which can couple a first profiled member having an internal compartment behind a slotted wall with a tubular second profiled member has an open-ended housing which is installed in the second profiled member and a one-piece profiled plate-like coupling member in the housing. The coupling member has two integral prongs with mirror symmetrical claws at their free ends, and followers adjacent the claws. The housing has integral cams which can stagger the claws by way of the followers in response to longitudinal displacement of the coupling member in the housing as a result of rotation of an eccentric which normally extends into a window of but is depressible into the second profiled member to permit insertion or removal of the connector. The claws can be introduced through the slot in the wall of the first profiled member to be thereupon staggered by the followers in cooperation with the cams in response to rotation of the eccentric in a direction to move the claws toward the housing. The coupling member has an integral spring which biases the eccentric into the window of the second profiled member.

33 Claims, 4 Drawing Sheets

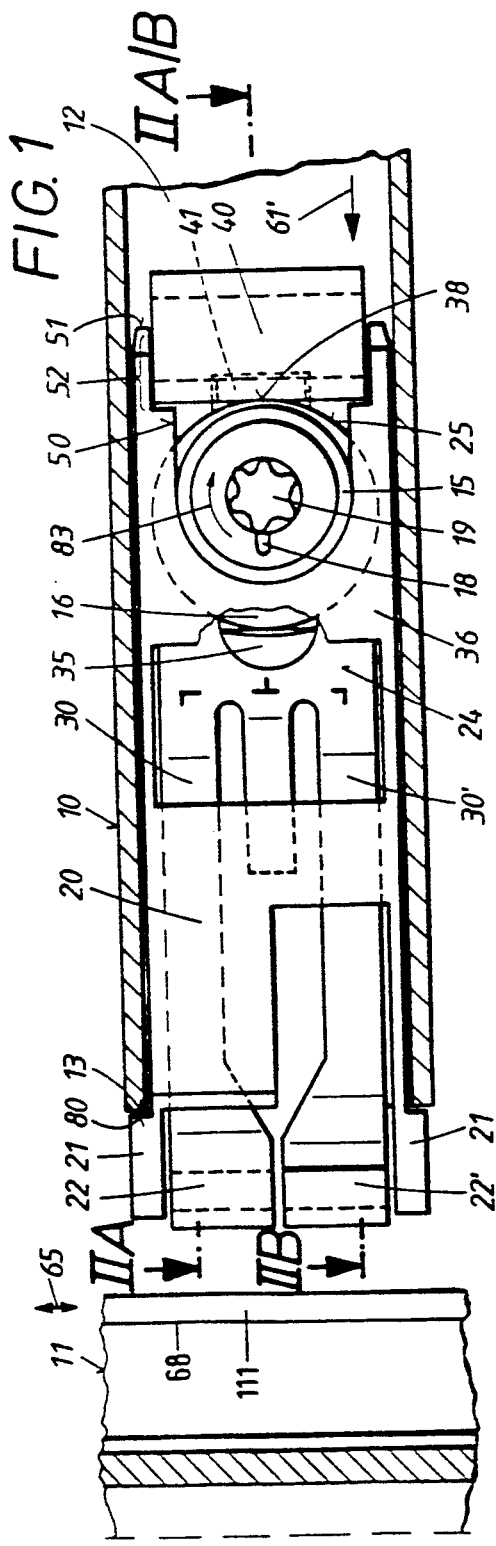
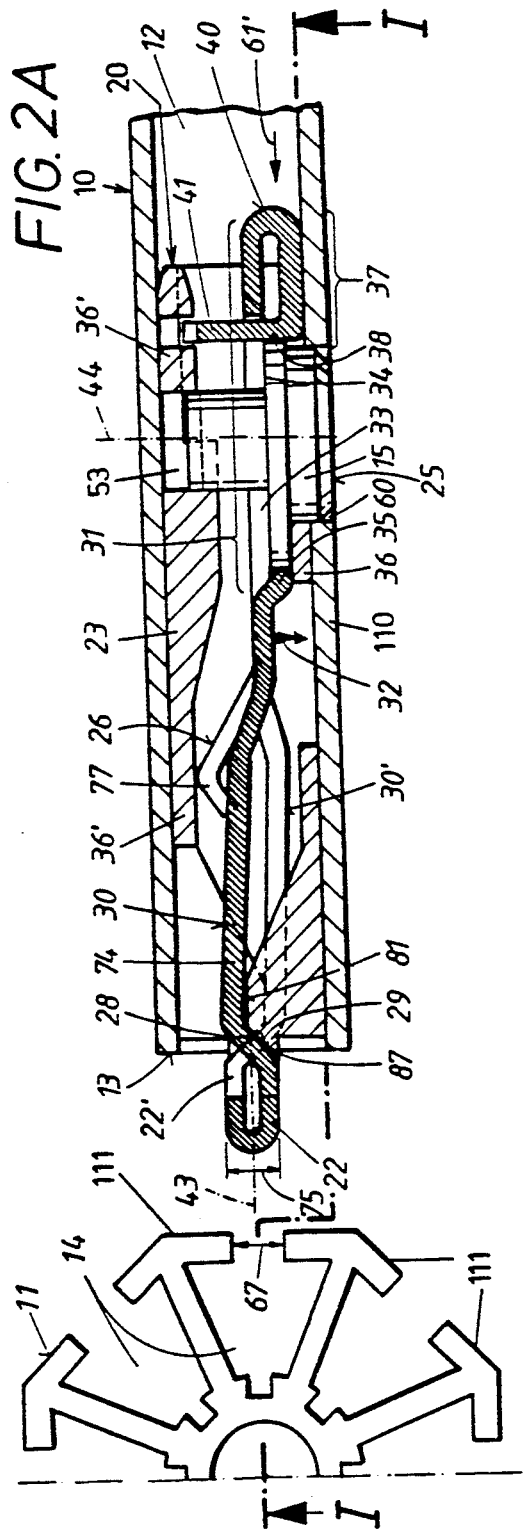

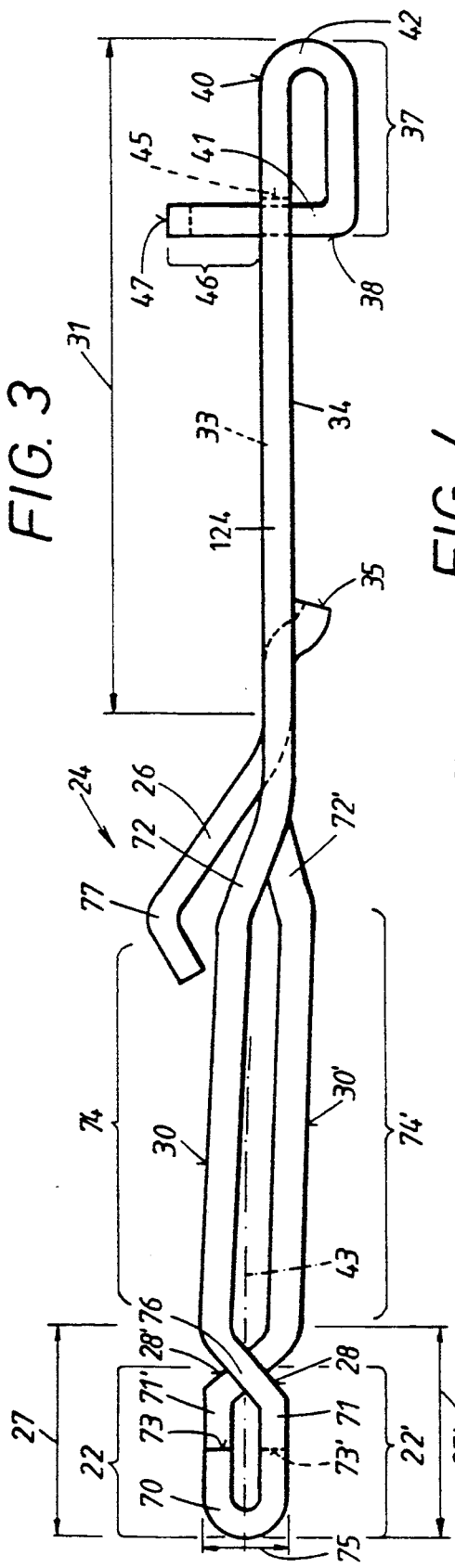
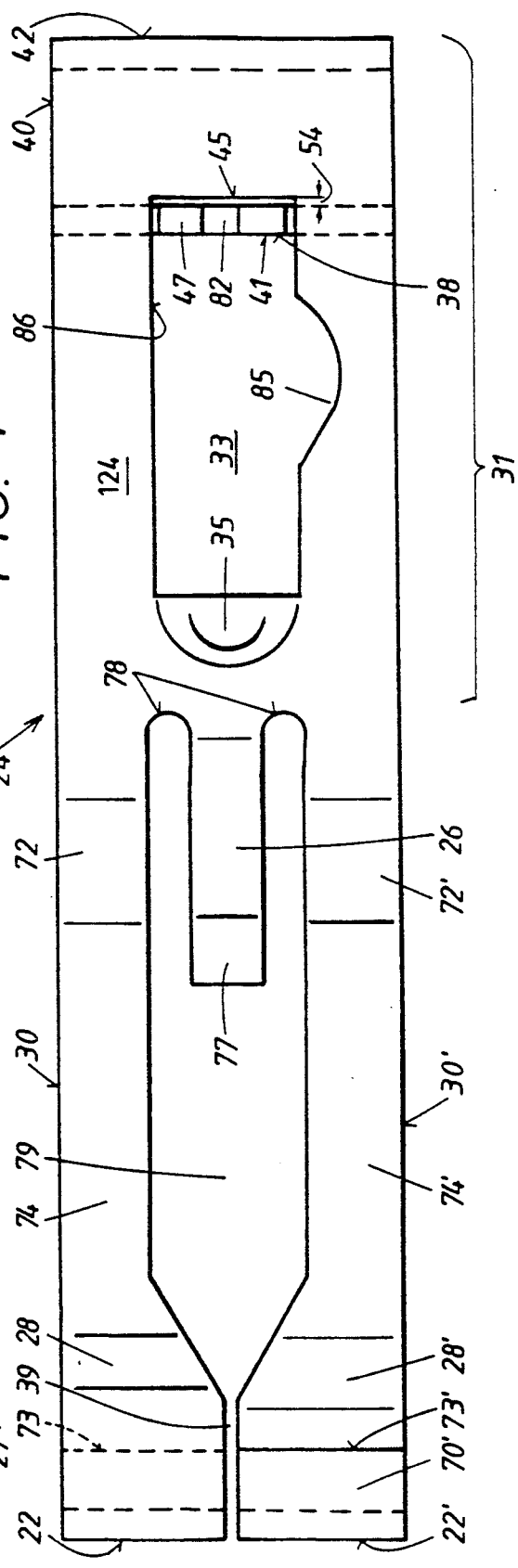
FIG. 3
FIG. 4

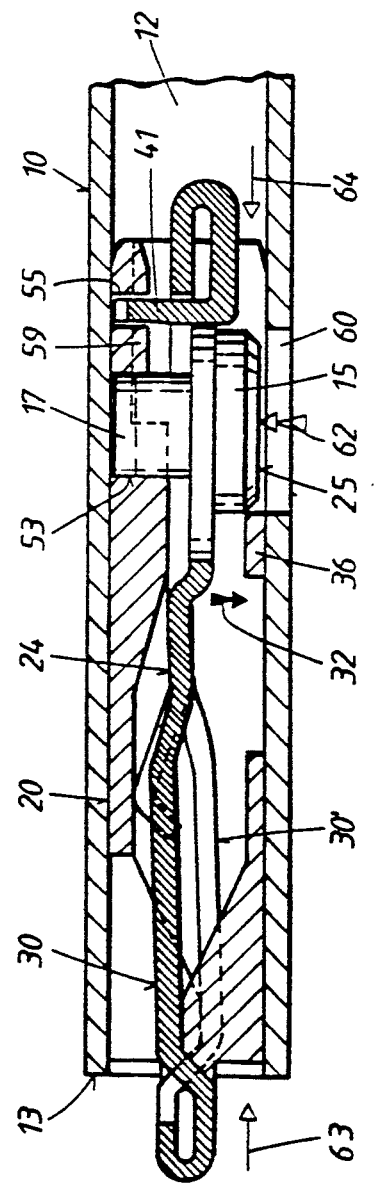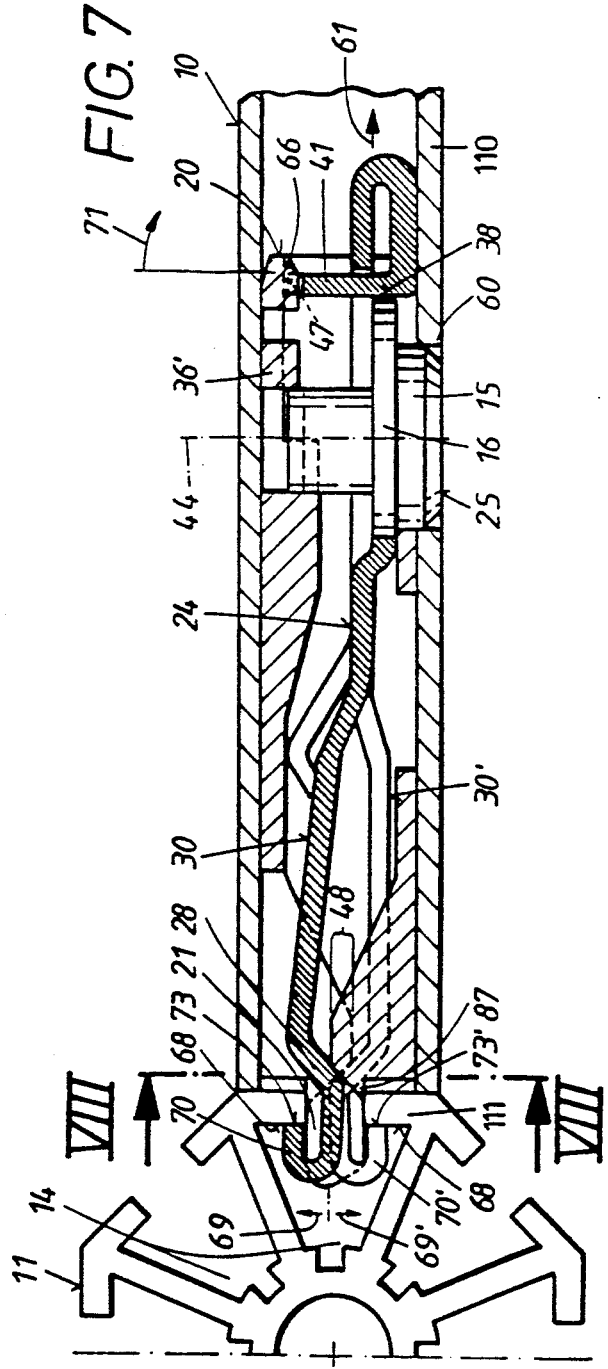

DEVICE FOR SEPARABLY COUPLING PROFILED MEMBERS

CROSS-REFERENCE TO RELATED CASE

The coupling device of the present invention is similar to that which is described and shown in commonly owned copending patent application Ser. No. 07/562,484 filed Aug. 3, 1990 by Gerd Vieler for "Connector for profiled members".

BACKGROUND OF THE INVENTION

The invention relates to improvements in coupling devices in general, and more particularly to improvements in so-called connectors which can be used to separably couple pairs of profiled structural members in the form of columns, beams, tubes, rods or the like.

It is often necessary to assemble two or more profiled members into a frame in such a way that the thus coupled members can be readily separated from each other, e.g., to collapse the frame for the purposes of transport, to replace a damaged member and/or for other reasons.

German Pat. No. 31 53 232 discloses a connector which can be used to separably couple profiled structural members to each other and which permits detachment of a selected profiled member from the other member or members. A drawback of the patented connector is that its reliability under certain circumstances is not entirely satisfactory. The connector employs a profiled plate with a single hook-shaped jaw or claw and relies on the so-called pushbutton principle to attach the connector to, or to detach the connector from, a profiled member. Since the connector employs a single jaw or claw, it can properly engage an internal surface only at one side of the locus of introduction of the single claw into an internal compartment of a profiled member which is to be separably coupled to the profiled member containing or supporting the patented connector. The plate which carries the single claw has an integral spring which bears against the housing of the connector to urge the plate and the claw in a given direction, namely to urge the plate against a cam which shifts the claw sideways during a certain stage of application of the patented connector. The spring acts close to the claw, i.e., at the front end of the plate. Therefore, the bias of such spring in a direction to maintain the eccentric (which can move the plate relative to its housing) in requisite position (namely to prevent detachment of the connector from the profiled member in which the connector is installed) is negligible. This affects the safety of the patented connector and of the assembly of profiled members which is obtained by resorting to one or more patented connectors. It has been found that, in certain instances, the eccentric is not likely to snap into the profiled member in which the patented connector is installed.

German Pat. No. 22 39 370 discloses a connector wherein two plates are installed in a common housing and can be moved relative to the housing in response to rotation of a single eccentric. The outer ends of the plates abut each other; nevertheless, the combined thickness of such plates, in addition to the combined thickness of claws and cams, is excessive for many applications where the claws of the connector should be capable of passing through relatively narrow slots or other inlets to internal compartments of certain profiled members. Moreover, this patent does not disclose or suggest to operate the eccentric as a pushbutton in order to drive the eccentric into the respective profiled member preparatory to removal of the patented connector from such profiled member. The reason is that the patented connector must employ two discrete biasing devices, one for each plate, and such biasing devices must act in opposite directions in order to bias the plates toward and against each other as well as against a post or stud between two inclined surfaces of the plates.

U.S. Pat. No. 4,799,819 to Swoboda discloses a connector wherein the free ends of legs of a substantially U-shaped coupling member are adjacent each other (they lie against each other face-to-face) and have claws which extend in opposite directions. The coupling member is reciprocable by an eccentric which also serves to displace a mobile cam between the legs of the U-shaped coupling member. The cam spreads the claws apart subsequent to introduction into the internal compartment of a profiled member so that the claws can engage the internal surface of the profiled member at opposite sides of an inlet to the internal compartment. The patentee further proposes a connector which can engage a T-shaped profiled member, again by utilizing one or more cams which are movable longitudinally of the housing for the profiled U-shaped coupling member.

OBJECTS OF THE INVENTION

An object of the invention is to provide a novel and improved connector which is simpler, more compact, less expensive and easier to manipulate than heretofore known connectors.

Another object of the invention is to provide a connector which can be installed in or removed from a support, such as a profiled member, in a simple and time saving manner.

A further object of the invention is to provide a connector which is safer than heretofore known connectors because it can be detached from its support only when the parts which are to be coupled to each other are already separated from or are yet to be connected to one another.

An additional object of the invention is to provide a connector which is designed to prevent damage to the parts which are connected thereby when the stressing of such parts exceeds the anticipated value.

Still another object of the invention is to provide a novel and improved method of manipulating the above outlined connector.

A further object of the invention is to provide a connector which can be designed to separably couple existing profiled members, i.e., to replace conventional connectors.

Another object of the invention is to provide the connector with novel and improved means for limiting the extent of movability of its constituents relative to each other.

A further object of the invention is to provide a novel and improved combination of the above outlined connector with one or more profiled members.

Still another object of the invention is to provide novel and improved combination of jaws or claws for use in the above outlined connector.

A further object of the invention is to provide a connector which consists of a small number of relatively simple and inexpensive parts and which can be manipulated by resorting to available tools.

Another object of the invention is to provide a novel and improved housing and a novel and improved coupling member for use in the above outlined connector.

SUMMARY OF THE INVENTION

The invention is embodied in a connector which is designed to separably couple a first profiled member, wherein a wall has an internal surface confronting an internal compartment and the wall has an inlet affording access to the compartment, with a second profiled member having an internal space and an open end affording access to the internal space. The improved connector comprises an elongated hollow housing (e.g., a tube) which is insertable into and withdrawable from the internal space by way of the open end of the second profiled member, a coupling member which is longitudinally movably received in the housing and includes elongated first and second prongs having claws which are located outside of the housing and are insertable into the compartment of the first profiled member by way of the inlet to engage the internal surface at opposite sides of the inlet, means for moving the coupling member relative to the housing in a predetermined direction to draw the claws toward the interior of the housing and to thereby urge the claws against the internal surface of the wall of the first profiled member, and cam and follower means provided on the housing and on the prongs and being operative to stagger the claws relative to each other in response to movement of the coupling member in the predetermined direction.

The coupling member can comprise a profiled plate which, in turn, includes the two prongs. The moving means preferably includes an eccentric which is rotatably mounted in the housing and is accessible from the exterior of the second profiled member. The plate has an elongated slot between the prongs, and the slot has a rear end portion which is remote from the claws and is adjacent the eccentric. The plate further comprises projections which flank and are engageable by the eccentric to move the coupling member relative to the housing in the predetermined direction in response to rotation of the eccentric in a first direction and to move the coupling member counter to the predetermined direction in response to rotation of the eccentric in a second direction counter to the first direction. The second profiled member is preferably provided with a window for a portion of the eccentric, and the connector further comprises means for yieldably biasing such portion of the eccentric into the window of the second profiled member to thereby hold the housing of the connector against unintentional movement relative to the second profiled member.

The claws of the two prongs are preferably similar, most preferably mirror symmetrical to each other with reference to a plane which is normal to the axis of rotation of the eccentric. The cam and follower means are designed to move the claws relative to each other transversely of the aforementioned plane between first positions in which the claws are insertable into and withdrawable or extractible from the compartment by way of the inlet in the wall of the first profiled member, and staggered second positions in which the claws engage the internal surface of the wall of the first profiled member at opposite sides of the inlet. The movements of the claws to their staggered positions is effected by the cam and follower means in response to rotation of the eccentric in the first direction, namely in a direction to move the coupling member relative to the housing in the predetermined direction. The claws comprise shanks or first legs at opposite sides of the aforementioned plane and hook-shaped heads (including second legs) which are aligned with each other in the first positions of the claws.

The follower means preferably include first and second followers on the respective prongs, and such followers cross each other adjacent the respective claws. The prongs preferably further include elongated portions, and the followers are disposed between the elongated portions and the claws of the respective prongs. The elongated portions of the two prongs are mirror symmetrical to each other with reference to the aforementioned plane. One of the projections of the coupling member is adjacent bent portions of the two prongs; such bent portions are disposed between the one projection and the elongated portions of the respective prongs.

The followers of the two prongs are provided with mutually inclined surfaces, and the cam means have complementary mutually inclined cam faces on the housing of the connector. Portions of the two cam faces cross each other, and such portions of the cam faces can be slightly convex. Each convex portion can be engaged by the shank of the respective claw in response to movement of the coupling member in the predetermined direction, and by the respective elongated portion in response to movement of the coupling member counter to the predetermined direction.

Each claw is preferably U-shaped and has a thickness which at most equals the width of the inlet in the wall of the first profiled member. Each U-shaped claw comprises a first leg (the aforementioned shank) which is rigid with the respective follower, and a second leg forming part of the respective head. The cam and follower means can move the two claws relative to each other between first (unstaggered) positions in which the first and second legs of one of the claws are respectively coplanar or nearly coplanar with the second and first legs of the other claw (the claws are then free to enter the compartment of the first profiled member by way of the inlet in the wall of the first profiled member), and second (staggered) positions in which the first leg of one of the claws is coplanar with the first leg of the other claw (the claws are then prevented from leaving the compartment of the first profiled member because their combined width exceeds the width of the inlet in the wall of the first profiled member).

The housing of the connector is preferably provided with two coplanar extensions which flank the claws and are movable into and from the compartment through the inlet in the wall of the first profiled member. The housing of the connector preferably includes a main section having an open end for insertion of the coupling member, and the cam means of the housing are disposed between the two extensions and project outwardly beyond the open end of the main section of the housing.

The aforementioned portion (such as a cylindrical head) of the eccentric is aligned with the window in the second profiled member, and the aforementioned biasing means preferably includes a leaf spring which is an integral part of the coupling member and urges the head of the eccentric into the window of the second profiled member to thereby hold the connector against movement in and longitudinally of the internal space of the second profiled member. The spring is preferably flanked by the bifurcated end portion of the slot between the two prongs of the coupling member, namely by that end portion of the slot which is remote from the claws. The spring can form an integral tongue of the coupling member and is then flanked by the two branches or legs of the bifurcated rear end portion of the slot. The spring is preferably elongated and extends in a direction from the moving means (eccentric) toward the claws.

As mentioned above, one projection of the coupling member is disposed between the eccentric and the claws, and more specifically between the eccentric and bent portions of the prongs (such bent portions are remote from the respective claws). The other projection is or can be formed by a looped end portion of the coupling member, namely by that end portion which is remotest from the claws. The looped end portion can form a substantially closed loop and can include a leg extending in substantial parallelism with the axis of rotation of the eccentric. The other projection can form part of or constitute the leg of the looped end portion. The coupling member preferably includes a plate-like portion which is adjacent the eccentric and has an opening at a second portion of the eccentric as well as for the leg of the looped end portion. The coupling member has an internal surface which bounds the opening in the plate-like portion. The leg of the looped end portion is urged by the eccentric toward the adjacent portion of the internal surface of the coupling member in response to rotation of the eccentric in the first direction (to move the heads of the claws against the internal surface in the compartment of the first profiled member). The pressure of the eccentric upon the leg of the looped end portion is relaxed or terminated when the eccentric is rotated in a direction to move the coupling member relative to the housing, e.g., in a second direction counter to the predetermined direction, i.e., in a direction to disengage the heads of the claws from the internal surface of the wall of the first profiled member.

The leg of the looped end portion of the coupling member preferably extends transversely of the plate-like portion of the coupling member from one side of the plate-like portion, through the opening of the plate-like portion and beyond the other side of the plate-like portion. The leg of the looped end portion is or can be substantially straight and then preferably extends substantially at right-angles to the plane of the plate-like portion of the coupling member.

The eccentric is movable axially between an extended position in which its head is received in the window of the second profiled member and a retracted position in which the entire eccentric is located in the internal space of the second profiled member so that the connector can be inserted into or removed from the internal space of the second profiled member. As mentioned above, the leaf spring of the coupling member biases the eccentric to the first axial position and the housing of the connector is preferably provided with means for preventing axial movement of the eccentric to its retracted position after the eccentric has been rotated in the first direction to urge the claws against the internal surface of the wall of the first profiled member (i.e., to prevent accidental disengagement of the two profiled members). As mentioned above, the eccentric is flanked by two projections of the coupling member and one of these projections is engaged by the eccentric for the purpose of disengaging the claws from the wall of the first profiled member (by rotating the eccentric in the second direction). The other projection can constitute a component (particularly the aforementioned leg) of the looped end portion of the coupling member, and the preventing means of the housing is preferably adjacent such component or leg or other projection of the coupling member. The leg of the looped end portion is preferably pivotable by the eccentric between first and second positions in response to rotation of the eccentric in the first and second direction, respectively. The preventing means is designed to prevent a movement of the leg and of the eccentric in the axial direction of the eccentric toward the retracted position of the eccentric in the second position of the leg, namely when the claws bear against the wall of the first profiled member. The preventing means is adjacent an end face of the leg of the looped end portion in the second position of such leg. The preventing means preferably forms part of a wall member of the housing. Such wall member can be provided with an aperture which is adjacent the preventing means and is aligned with the end face of the leg of the looped end portion in the first position of the leg so that the wall member cannot prevent an axial movement of the eccentric into the second profiled member preparatory to removal of the connector from the second profiled member if the head of the eccentric is pushed into the internal space of the second profiled member by hand or by resorting to a suitable tool.

The housing includes a second wall member which is adjacent the window of the second profiled member in inserted position of the housing. The front side of the second wall member confronts the window, and the front side of the looped end portion of the coupling member can be flush with the front side of the second wall member when the claws engage the internal surface of the wall of the first profiled member.

The leg of the looped end portion of the coupling member and the internal surface of the coupling member in the aforementiond opening preferably define a clearance, at least when the claws are disengaged from the wall of the first profiled member. The leg of the looped end portion of the coupling member is or can be at least slightly elastic and undergoes elastic deformation in response to rotation of the eccentric in the first direction (i.e., when the eccentric acts upon the leg of the looped end portion to move the claws toward the housing and thus into engagement with the internal surface of the wall of the first profiled member).

The novel features which are considered as characteristic of the invention are set forth in particular in the appended claims. The improved connector itself, however, both as to its construction and the method of using the same, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a fragmentary longitudinal sectional view of the two profiled members and an elevational view of the improved connector, the section being taken in the direction of arrows from the line I—I of FIG. 2A and the claws of the prongs of the coupling member being shown in positions outwardly adjacent the inlet of one of several walls of the first profiled member;

FIG. 2A is a sectional view substantially as seen in the direction of arrows from the line IIA—IIA/B in FIG. 1;

FIG. 3 is an enlarged elevational view of the coupling member in the connector of FIGS. 1, 2A and 2B;

FIG. 4 is an enlarged plan view of the coupling member;

FIG. 6 shows the connector and the second profiled member in a view similar to that of FIG. 2A but with the eccentric retracted to the second profiled member;

FIG. 7 is a view similar to that of FIG. 2A but showing the claws of the prongs of the coupling member in engagement with the internal surface of the adjacent wall of the first profiled member.

DESCRIPTION OF PREFERRED EMBODIMENTS

Figure 2B:
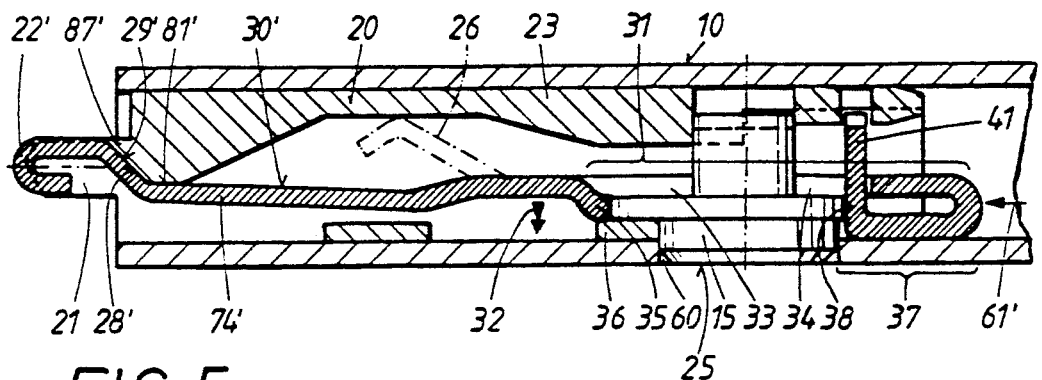
FIG. 2B is a sectional view substantially as seen in the direction of arrows from the line IIB—IIA/B in FIG. 1.

FIGS. 1, 2A and 7 show a first profiled member 11, a second profiled member 10, and a connector 20 which embodies the invention and serves to separably couple one end of the profiled member 10 to any one of several sides or facets of the profiled member 11.

The profiled member 11 is an upright octagonal column with eight mutually inclined walls 111 and with eight internal compartments 14, one behind each of the walls 111. The walls 111 have elongated slot-shaped inlets 67 which afford access to the respective compartments 14, and each wall 111 has an internal surface 68 at both sides of the respective inlet 67. The compartments 14 are elongated grooves or channels which can extend all the way from the one to the other longitudinal end of the column-shaped profiled member 11.

Figure 8:
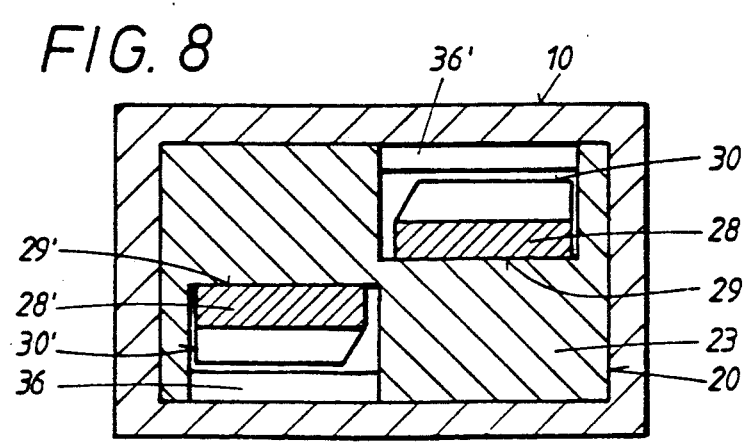
FIG. 8 is an enlarged transverse sectional view as seen in the direction of arrows from the line VIII—VIII of FIG. 7.

The profiled member 10 is an elongated tube which, in the illustrated embodiment, has a rectangular cross-sectional outline (see particularly FIG. 8) and has a front wall 110 with a round opening or window 60 for the outer portion 15 (preferably a cylindrical head) of an eccentric 25 which serves as a means for engaging a rear part of and for moving a profiled plate-like coupling member 24 relative to an elongated open-ended housing 23 of the connector 20. The profiled member 10 has an open front end 13 which permits insertion of the housing 23 into and removal (e.g., extraction or expulsion) of the housing from the internal space 12 of the member 10. When the housing 23 is properly located in the internal space 12, the head 15 of the eccentric 25 is biased into the window 60 by a leaf spring 26 on the rear part of the coupling member 24 so that the connector 20 is held in a preselected position (as seen longitudinally of the profiled member 10).

In accordance with a feature of the invention, the profiled plate-like coupling member 24 of the connector 20 comprises two elongated longitudinally extending prongs 30, 30' which constitute a front part of the member 24 and include front end portions in the form of substantially U-shaped claws 22, 22'. The claws 22, 22' are located outside of the main section of the substantially tubular housing 23 which latter is, or can be, a sliding fit in the internal space 12 of the profiled member 10. The claws 22, 22' are mirror symmetrical to each other with reference to a plane 43 (FIG. 2A) which is normal to the axis of rotation 44 of the eccentric 25, and these claws are movable relative to each other in directions at right angles to the plane 43, namely between first positions which are shown in FIG. 2A and second positions which are shown in FIG. 7 and in which the two claws are staggered relative to each other. Such staggering is effected by followers 28, 28' which are provided on (and which form part of) the respective prongs 30, 30', and by cams 29, 29' which form part of the housing 23 and are respectively adjacent the followers 28, 28'. The cams 29, 29' cooperate with the adjacent followers 28, 28' to stagger the claws 22, 22' upon completed insertion of the claws into a selected compartment 14 of the profiled member 11 and in response to rotation of the eccentric 25 in a first direction 83 (clockwise, as seen in FIG. 1) in order to move the claws 22, 22' toward the housing 23, i.e., to draw the coupling member 24 deeper into the housing. Such spreading or staggering of the claws 22, 22' ensures that the end faces 73, 73' of hook-shaped heads 70, 70' of the claws 22, 22' are caused to bear against the internal surface 68 of the selected wall 111 as the open front end 13 of the profiled member 10 bears against the outer side of the selected wall 111 and the coupling member 24 is caused to move in a predetermined direction (arrow 61 in FIG. 7).

The connector 20 is a prefabricated and preassembled unit which consists of three parts, namely the housing 23, the coupling member 24 and the eccentric 25. The eccentric 25 is rotatable in the housing 23 to move the coupling member 24 in the predetermined direction (arrow 61) or in a second direction (arrow 61') counter to the predetermined direction. The coupling member 24 is moved in the direction of arrow 61' (by rotating the eccentric 25 in a counterclockwise direction, as seen in FIG. 1) in order to disengage the heads 70, 70' of the claws 22, 22' from the internal surface 68 of the selected wall 111 of the profiled member 11 as well as to move the followers 28, 28' relative to the respective cams 29, 29' in a sense to enable the prongs 30, 30' to move relative to each other due to their innate elasticity and to move the heads 70, 70' to positions of alignment with each other and with two extensions 21 of the housing 23 so that the claws can be withdrawn from the selected compartment 14 by way of the respective inlet 67.

The profiling of the plate-like coupling member 24 is shown in FIGS. 3 and 4. This plate-like member is preferably made of spring steel, namely from an elongated substantially rectangular blank of metallic sheet material which is provided with an elongated slot 39 extending between the two prongs 30, 30' and having an enlarged median portion 79 as well as a bifurcated rear end portion or closed end 78. The two branches of the bifurcated closed end 78 flank the aforementioned leaf spring 26 which is an integral part of the coupling member 24 and is elongated in a direction from the eccentric 25 toward the claws 22, 22'.

The claws 22, 22' constitute integral front end portions of the respective prongs 30, 30' and extend beyond the main section of the housing 23 as well as beyond the open front end 13 of the profiled member 10 when the leaf spring 26 is free to bias the cylindrical head 15 of the eccentric 25 into the window 60 in the front wall 110 of the profiled member 10.

When they are not stressed, the prongs 30, 30' are bent in opposite directions (FIG. 3) and their elongated portions 74, 74' are disposed at opposite sides of the symmetry plane 43. The hooked heads 70, 70' are aligned with each other (i.e., they are located behind one another as seen in FIG. 3), and their hooked heads 70, 70' extend in opposite directions. This ensures that the end face 73 can engage an internal surface 68 at one side and that the end face 73' can engage the same internal surface 68 at the other side of the respective inlet 67.

An elongated plate-like portion 124 of the coupling member 24 is flat or practically flat substantially all the way from the bifurcated closed end 78 of the slot 39 to the rearmost point of the coupling member, namely the bight 42 of a looped rear end portion 40 of the coupling member which is located behind the eccentric 25. The length of the substantially flat plate-like portion 124 is shown at 31. The length of the looped end portion 40 is shown in FIG. 3, as at 37; it is or can be a small fraction of the length of the plate-like portion 124. The combined length of the claw 22 and follower 28 is shown at 27 (FIG. 3); it matches the combined length 27' of the claw 22' and follower 28'. The followers 28, 28' have crossing surfaces which cooperate with adjacent cam faces of the respective cams 29, 29' when the eccentric 25 is rotated in a direction to move the coupling member 24 relative to the housing 23 in the direction of arrow 61, namely to stagger the claws 22, 22' while they are caused to move toward engagement with a selected internal surface 68 at opposite sides of the corresponding inlet 67.

When the claws 22, 22' are aligned with each other and with the extensions 21 of the housing 23 (FIGS. 2A and 2B), they project from the housing 23 through a maximum distance and their combined height or thickness 75 (FIG. 3) as measured at right angles to the plane 43 (i.e., in the axial direction of the eccentric 25) at most equals but is preferably at least slightly less than the width of an inlet 67 so that the claws can be readily introduced into the selected compartment 14 by moving the profiled member 11 toward the open end 13 of the profiled member 10 and/or vice versa. The claws 22, 22' extend from the front end 13 of the profiled member 10 so that such front end can abut the outer side of the selected wall 111 of the profiled member 11.

The followers 28, 28' are located between the claws 22, 22' and the elongated portions 74, 74' of the respective prongs 30, 30', and the aforementioned surfaces of the followers 28, 28' cross each other substantially midway between the claws and the elongated portions when the prongs 30, 30' assume the substantially unstressed or less stressed positions which are shown in FIGS. 2A, 2B and 6. The elongated portions 74, 74' of the prongs 30, 30' can but need not be exactly mirror symmetrical to each other with reference to the plane 43. The transition between the rear ends of the elongated portions 74, 74' and the plate-like portion 124 of the coupling member 24 is established by two bent portions 72, 72' (see FIGS. 3 and 4) which may but need not be exactly mirror symmetrical to each other with reference to the plane 43 (they are not mirror symmetrical to each other in FIG. 3).

When the prongs 30, 30' are free to assume the unstressed positions of FIGS. 2A, 2B, 3 and 6, the shank or leg 71 of the claw 22 is at least substantially coplanar with the leg portion of the hook-shaped head 70' of the claw 22' and the shank or leg 71' of the claw 22' is at least substantially coplanar with the leg portion of the hook-shaped head 70 of the claw 22. At such time, the combined height 75 of the claws 22, 22' is not more than the width of an inlet 67, i.e., the claws can be introduced into or withdrawn from a selected compartment 14 of the profiled member 11. When the cam faces of the cams 29, 29' of the housing 23 have acted upon the surfaces of the respective followers 28, 28' (in response to a movement of the coupling member 24 in the direction of arrow 61), the claws are staggered and the leg 71 is then at least substantially coplanar with the leg 71' (FIG. 7) so that the combined height of the claws 22, 22' exceeds the width of an inlet 67. This prevents extraction of the claws from the selected compartment 14 before the eccentric 25 is rotated to move the coupling member 24 in the direction of arrow 61' whereby the surfaces of the followers 28, 28' can move inwardly beyond the faces of the respective cams 29, 29' so that the cam faces do not bear against the legs 71, 71' and permit return movement of the claws to the position of FIG. 3. At the same time, the end faces 73, 73' of the hooked heads 70, 70' move away from the internal surface 68 so that the claws are disengaged from the wall 111 and can be readily withdrawn from the selected compartment 11 by way of the corresponding inlet 67.

Each of the prongs 30, 30' can be said to have a substantially S-shaped profile. The point or locus where the prongs 30, 30' cross each other (at the followers 28, 28') in unstressed condition of the prongs is shown at 76 in FIG. 3. The profiles of the two prongs then together form a substantially 8-shaped body.

The leaf spring 26 of the coupling member 24 has an apex 77 which bears against the inner side of the adjacent rear wall member 36' of the housing 23 and biases the plate-like portion 124 against a disc-shaped portion 16 (hereinafter disc) of the eccentric 25 toward and normally into the window 60 in the front wall 110 of the profiled member 10. The front side of the disc 16 then bears against the inner side of the front wall member 36 of the housing 23. It is clear that the integral leaf spring 26 of the coupling member 24 can be replaced with a separately produced spring (e.g., a coil spring) which is inserted into the housing 23 to bear against the disc 16 or against another part or the eccentric 25 and to react against the housing 23 and/or coupling member 24 in order to normally maintain the cylindrical head 15 of the eccentric in the window 60. The apex 77 of the leaf spring 26 has a convex surface which contacts the inner side of the rear wall member 36' to thus ensure that the coupling member 24 can move longitudinally of and within the main section of the housing 23 with a minimum of friction.

The width of the leaf spring 26 can be increased so that it equals or approximates the width of the relatively wide median portion 79 of the slot 39 between the prongs 30 and 30'. The direction in which the leaf spring 26 (which can be said to constitute a relatively short tongue between the adjacent portions 72, 74 and 72', 74' of the prongs 30, 30') acts upon the plate-like portion 124 and hence upon the disc 16 of the eccentric 25 is indicated by arrow 32 (FIGS. 2A, 2B, 5 and 6). The disc 16 is acted upon by the adjacent side or surface 34 of the plate-like portion 124 of coupling member 24.

The plate-like portion 124 is formed with an opening 33 which serves to permit passage of a further portion 17 of the eccentric 25 as well as of a straight leg 41 which forms part of the looped rear end portion 40 of the coupling member 24. The end portion 40 forms a substantially closed loop (see, for example, FIG. 3) and its leg 41 is elatic and extends in parallelism with the axis 44 of the eccentric 25 in a direction from the side 34 and through and beyond the opening 33 toward the rear wall member 36' of the housing 23. The opening 33 in the plate-like portion 124 of the coupling member 24 is an elongated nearly rectangular slot (see particularly FIG. 4) which is flanked by two projections 35, 38. The projection 35 is located between the opening 33 and the prongs 30, 30' (FIG. 4) and is engaged and acted upon by the disc 16 when the coupling member 24 is moved in the direction of arrow 61'. The other projection 38 is a part of (or is constituted by) the leg 41 of the looped end portion 40 and is located substantially diametrically opposite and behind the projection 35. The disc 16 of the eccentric 25 acts upon the projection 38 (i.e., upon the leg 41) when the coupling member 24 is moved in the direction of arrow 61. The projections 35, 38 extend beyond the side 34 of the plate-like portion 124 and flank the disc 16 of the eccentric 25.

The projection 35 can be formed by displacing a part of the plate-like portion 124 from the general plane of the coupling member 24 in a direction beyond the side 34, i.e., in the axial direction of the eccentric 25. This can be readily seen in FIG. 3. The looped end portion 40 includes (a) two parallel legs 43 one of which is coplanar with the plate-like portion 124 (see FIG. 3) and which are integrally connected to each other by the bight 42, and (b) the aforementioned straight leg 41 which can be said to constitute a lever-shaped component and is pivotable in and counter to the direction indicated by arrow 71 (FIG. 7).

In order to assemble the connector 20, the stub-shaped portion 17 of the eccentric 25 is introduced into the opening 33 from the side 34 so that the disc 16 is located between the projections 35 and 38 of the coupling member 24. The parts 24, 25 are thereupon introduced into the housing 23 through the open rear or inner end 51 (FIG. 5) of the housing. This causes the cylindrical stub-shaped portion 17 (hereinafter called stub) of the eccentric 25 to enter a semicircular recess 50 (FIG. 1) in the wall member 36' of the housing 23. The recess 50 extends all the way to the open inner or rear end 51 of the housing 23 and has a wider rear portion 52 (FIG. 1) which serves to receive a part of the looped end portion 40. The eccentric 25 is then moved axially to introduce the stub 17 into a hole 53 in the rear wall member 36' of the housing 23. The surface around the hole 53 surrounds one-half of the periphery of the stub 17. The rear portion of the periphery of the stub 17 in the hole 53 is adjacent an inwardly extending protuberance 59 (FIG. 5) of the rear wall member 36'. The protuberance 59 facilitates predictable and rapid assembly of the coupling member 24 and eccentric 25 with the housing 23. This protuberance can resemble an elongated rib which extends substantially radially of the stub 17 in the hole 53.

The end face of the stub 17 has a diametrically extending groove or notch 58 which receives and slides along the protuberance 59 during introduction of the eccentric 25 and coupling member 24 into the housing 23. When the assembling step is completed, the side 34 of the plate-like portion 124 bears against the disc 16 because the leaf spring 26 bears against the rear wall member 36' and urges the plate-like portion 124 toward the front wall member 36 of the housing 23. The disc 16 abuts the inner side of the front wall member 36 and is flanked by the projections 35 and 38 of the coupling member 24. This is the extended position of the eccentric 25.

The front end face of the cylindrical head 15 of the eccentric 25 has a centrally located profiled recess 19 (FIG. 1) for the working end of a suitable tool (not shown) which is used by the operator to rotate the eccentric in a clockwise or in a counterclockwise direction. The tool can be a manually operated tool or a power tool (e.g., a motor-driven screwdriver). The front end face of the head 15 is further provided with an index or marker 18 in the form of a straight notch which indicates the locus of maximum eccentricity of the disc 16 relative to the stub 17 and head 15. The marker 18 enables the operator to ascertain the angular position of the disc 16. If desired, the outer side of the wall 110 of the profiled member 10 can carry a scale (not shown) to facilitate rapid determination of the angular position of the disc 16. When the assembly of the connector 20 is completed, the marker 18 extends toward the claws 22 and 22'. This indicates to the operator that the combined thickness of the claws 22, 22' has been reduced to the minimum value (75), i.e., that the claws are ready to enter the selected compartment 14 by moving the profiled member 10 (with the properly installed connector 20 therein) in the direction of arrow 61'. At such time, the claws 22, 22' extend through a maximum distance beyond the open front end of main section of the housing 23 and are flanked by and are coplanar with the aforementioned extensions 21 of the housing. The marker 18 should extend toward the claws 22, 22' to indicate that the assembled connector 20 is ready for introduction into or removal from the profiled member 10.

Introduction of the connector 20 into the profiled member 10 is preceded by depression of the eccentric 25 into the housing 23 in the direction of arrow 62 (FIG. 6). Thus, the head 15 of the eccentric 25 is manipulated not unlike a pushbutton. To this end, the depth of the opening or hole 53 in the rear wall member 36' is selected in such a way that the stub 17 does not project outwardly beyond the wall member 36' even when the head 15 does not extend forwardly beyond the outer side of the front wall member 36 of the housing 23. This can be seen in FIGS. 6 and 7.

Figure 5:
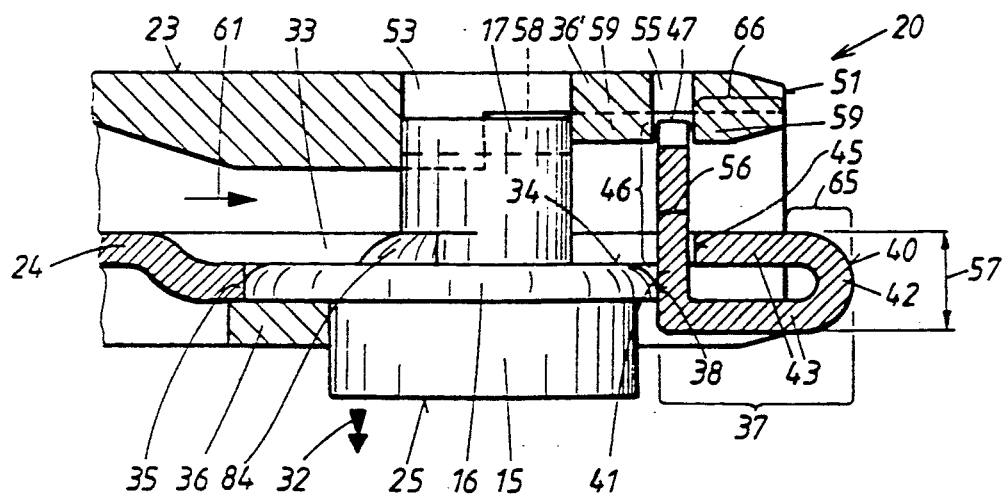
FIG. 5 is an enlarged view of a detail in the connector of FIGS. 1, 2A and 2B.

FIG. 5 shows the length (46) of that portion of the leg 41 (forming part of the looped end portion 40) which projects beyond the plate-like portion 124 and toward the rear wall member 36' of the housing 23. The end face 47 of the leg 41 can be received in an aperture 55 which is provided in the rear wall member 36' adjacent the protuberance 59 which serves as a means for preventing axial movement of the eccentric 25 to the retracted position of FIG. 6 when the end faces 73, 73' of the claws 22, 22' bear against the internal surface 68 of a selected wall 111. The end face 47 of the leg 41 has a centrally located cutout 92 (FIG. 4) which is sufficiently wide to receive the aforementioned rib- or web-shaped protuberance 59 of the rear wall member 36' with requisite clearance. The width of the leg 41 is less than the width of the other legs 43 and of the bight 42 of the looped end portion 40 (see FIG. 4). This renders it possible to introduce the leg 41 into, through and beyond the opening 33 in the plate-like portion 124 of the coupling member 24. In FIG. 6, the end face 47 of the leg 41 is aligned with and is received in the aperture 55 of the rear wall member 36'; this renders it possible to depress the cylindrical head 15 of the eccentric 25 so that the head 16 is fully received in the internal space 12 of the profiled member 10 and the connector 20 can be introduced into or removed from the internal space 12 by way of the open front end 13 of the profiled member 10. The arrow 63 indicates in FIG. 6 the direction of insertion of the connector 20 into the internal space 12 of the profiled member 10. The head 15 automatically snaps into the window 60 under the action of the leaf spring 26 as soon as the eccentric 25 reaches a position of alignment with the window. This locks the housing 23 against any axial movement relative to the profiled member 10 until and unless the head 15 is depressed again to enter the internal space 12. Such depression of the head 15 is possible only in a certain angular position of the eccentric 25, namely when the combined thickness of the claws 22, 22' is not more than the width of an inlet 67 and the end faces 73, 73' of the claws 22, 22' are disengaged from the internal surface 68 of a wall 111.

The extensions 21 are integral with and extend forwardly beyond the open front end of the main section of the housing 23. As mentioned above, these extensions flank and are aligned with the claws 22, 22' when the claws assume the positions which are shown in FIGS. 2A, 2B, 3 and 6, i.e., when the jaws are not staggered relative to each other under the action of the followers 28, 28' and cam faces of the cams 29, 29'. The rear end faces 80 (FIG. 1) of the extensions 21 serve as stops in that they come into abutment with the front end 13 of the profiled member 10 and prevent further penetration of the housing 23 into the space 12 when the coupling member 24 reaches an optimum position relative to the profiled member 10. The thickness of the extensions 21 (as measured at right angles to the plane 43) can equal or can be less than the combined thickness (75) of the claws 22, 22' in the positions these claws assume in FIGS. 2A, 2B, 3 and 6. The reason is that the extensions 21 should enter an inlet 67 together with the claws 22, 22' preparatory to staggering of the claws in a selected compartment 14 of the profiled member 11. The purpose of the extensions 21 is to prevent a change of orientatoon of the profiled member 10 relative to the profiled member 11 and/or vice versa during coupling or during separation of these profiled members. The extensions 21 abut the surfaces surrounding a selected inlet 67 and thus hold the profiled member 10 against tilting or turning relative to the profiled member 11 during rotation of the eccentric 25 in a clockwise or in a counterclockwise direction.

The leaf spring 26 is stressed when the coupling member 24 is properly received in the housing 23. This spring biases the plate-like portion 124 of the coupling member 24 against the disc 16 of the eccentric 25 and the spring also acts upon the prong 30. Thus, the spring 26 urges the surface of the follower 28 against the cam face of the cam 29 which is or can be an integral part of the housing 23. The cam face of the cam 29 is slightly convex (cupped), as at 81, but is generally parallel to the respective elongated portion 74. This ensures proper orientation of the claw 22 during movement of the coupling member 24 in the direction of arrow 61'. At such time, the claw 22 is aligned with the claw 22' and with the two extensions 21 to permit insertion into or withdrawal from a selected compartment 14. The convex portion of the cam face on the cam 29' is shown at 81' (FIG. 2B), and this cam face cooperates with the follower 28' to ensure that the claw 22' is aligned with the claw 22 and with the extensions 21 preparatory to same movement of the parts 21, 22, 22', 21 into or out of a selected compartment 14. The slightly convex or cupped portion 81' of the cam face on the cam 29' is substantially parallel to the elongated portion 74' of the respective prong 30'. As the follower 28' bears against the cam 29', the prong 30' stores energy and assists the leaf spring 26 in urging the plate-like portion 124 in the direction of arrow 32 in order to bias the side 34 against the disc 16 and to thus maintain the disc in abutment with the inner side of the front wall member 36 of the housing 23.

FIG. 2A shows the profiled members 10, 11 in positions prior to introduction of the aligned claws 22, 22' and extensions 21 into a selected inlet 67 by moving the profiled member 10 (with the properly installed connector 20) in the direction of arrow 61'. The head 15 of the eccentric 25 extends into the window 60 of the front wall 110 of the profiled member 10 so that the housing 23 is held against any movement longitudinally of the internal space 12 in the member 10. The operator in charge then employs a suitable tool (e.g., a screwdriver or the like) which is inserted into the recess 19 of the head 15 to turn the eccentric 25 in a clockwise direction (arrow 83 in FIG. 1). This causes the disc 16 to act against the projection 38 (i.e., against the leg 41 of the looped end portion 40) and to move the coupling member 24 relative to the housing 23 in the direction of arrow 61. Such turning of the eccentric 25 takes place subsequent to insertion of the claws 22, 22' and extensions 21 into a selected inlet 67 so that the front end 13 of the profiled member 10 abuts the outer side of the adjacent wall 111. Even a very small shifting of the coupling member 24 relative to the housing 23 (e.g., through a distance of 0.1 mm or an other fraction of one millimeter) suffices to move the leg 41 out of alignment with the aperture 55 in the rear wall member 36' of the housing 23 and into a position of at least partial overlap with the protuberance 59. The reference character 66 denotes in FIG. 5 the distance of the open rear end 51 of the housing 23 from the aperture 55. The thickness 56 of the leg 41 is or can be only slightly less than the width of the aperture 55 to ensure that even a minor shifting of the coupling member 24 relative to the housing 23 (i.e., a shifting in the range of one or more tenths of one millimeter) suffices to enable the protuberance 59 to prevent depression of the cylindrical head 15 of the eccentric 25 into the internal space 12 of the profiled member 10. In other words, the housing 23 of the connector 20 is locked against movement longitudinally of the internal space 12 of the profiled member 10 (arrows 63 and 64) as soon as the eccentric 25 leaves the neutral position of FIG. 1 by being turned in the direction of arrow 83. Therefore, the disc 16 remains adjacent the projection 38 of the leg 41 until and unless the eccentric 25 is returned to the neutral position of FIG. 1.

The arrangement may be such that the eccentric 25 can be turned (in the direction of arrow 83) through an angle of approximately 180°. This is necessary to more the maximum-eccentricity portion of the disc 16 from engagement with the front projection 35 into engagement with the rear projection 38. FIG. 5 shows that the eccentric 25 further comprises a lobe 84 which is inwardly adjacent the disc 16 and is received in a lateral extension 85 of the opening 33 (see FIG. 4) in neutral position of the eccentric.

As the eccentric 25 turns in the direction of arrow 83, the claws 22, 22' move in the direction of arrow 61 (i.e., toward the interior of the housing 23) and, at the same time, the followers 28, 28' cooperate with the respective cams 29, 29' to stagger the claws 22, 22' from the positions which are shown in FIG. 2A to those which are shown in FIG. 7. Thus, the claws 22, 22' are no longer aligned with the extensions 21 (which continue to orient the profiled members 10, 11 relative to each other) but are moved to positions in which their end faces 73, 73' overlie and ultimately bear against the internal surface 68 at opposite sides of the respective inlet 67. Such movements of the claws 22, 22' under the action of the followers 28, 28' and cams 29, 29' (i.e., transversely of the symmetry plane 43) are indicated in FIG. 7 by arrows 69 and 69'. The extent of movement of the claw 22 in the direction of arrow 69 can match the extent of movement of the claw 22' in the direction of arrow 69'. FIG. 7 shows that such movements of the claws take place in opposite direction, i.e., in directions to increase the combined thickness of the staggered claws 22, 22' beyond the width of an inlet 67. The end faces 73, 73' of the claws 22, 22' then cooperate with the front end 13 of the profiled member 10 to reliably clamp the respective wall 111 between the end faces 73, 73' and the profiled member 10. The marker 18 at the front side of the cylindrical head 15 of the eccentric 25 is then adjacent the projection 38, i.e., it has been moved through an angle of approximately 180° as a result of rotation of the disc 16 in the direction of arrow 83. At such time, a portion of or the entire lobe 84 of the eccentric 25 abuts an internal surface 86 of the coupling member 24 in the opening 33 of the plate-like portion 124 to prevent any further clockwiwe rotation of the eccentric 25 in the direction of arrow 83. This enables the person in charge to sense that the coupling operation is completed, i.e., that the front end 13 of the profiled member 10 bears against the outer side of the adjacent wall 111 and that the end faces 73, 73' of the staggered claws 22, 22' bear against the internal surface 68 of the same wall 111.

The plate-like portion 124 of the coupling member 24 has an internal surface 45 bounding that portion of the opening 33 which is adjacent the projection 38, i.e., next to the leg 41 of the looped rear end portion 40 of the coupling member If the rear side of the leg 41 actually abuts the surface 45 during movement of the coupling member 24 in the direction of arrow 61, the end portion 40 acts not unlike a rigid stop which can be shifted by the disc 16 of the eccentric 25. However, it is often desirable to rely on the elasticity of the leg 41 (which is an integral part of the coupling member 24 preferably consisting of spring steel or other suitable resilient material) and, therefore, the leg 41 can be positioned relative to the opening 33 in such a way (see FIGS. 3 and 4) that its rear side and the internal surface 45 define a relatively narrow clearance or gap 54. This enables the disc 16 to flex the leg 41 about an axis which is adjacent the inner side of the front wall member 36 of the housing 23 and in a direction which is indicated by the arrow 71 of FIG. 7. The flexed leg 41 stores energy and generates an additional force which urges the end faces 73, 73' of the claws 22, 22' against the internal surface 68 of the adjacent wall 111. An advantage of the clearance 54 is that the leg 41 can yield in response to the application of excessive stresses which could cause damage to the profiled member 10 and/or 11. This can be important if the material of the profiled member 10 and/or 11 is relatively soft, e.g., aluminum or an aluminum alloy.

The surfaces of the followers 28, 28' need not remain in permanent contact with the median portions of the cam faces of the respective cams 29, 29'. The arrangement may be such that, when the movement of the coupling member 24 (relative to the housing 23) in the direction of arrow 83 is completed, the shanks 71, 71' of the claws 22, 22' respectively engage the cupped or convex portions 81, 81' of the respective cams 29, 29'. The portions 81, 81' of the cams 29, 29' then act not unlike locks which prevent movements of the claws 22, 22' counter to the directions which are indicated by the arrows 69 and 69' of FIG. 7, i.e., the end faces 73, 73' of the claws 22, 22' are compelled to remain in alignment with and to bear against the internal surface 68 at opposite sides of the selected inlet 67. The tips 87 and 87' (FIGS. 2A, 2B and 7) of the cams 29, 29' then extend into the space between the extensions 21 of the housing 23 (this is shown in FIG. 7) and into the adjacent portions of the inlet 67. This enables the cams 29, 29' to cooperate with the extensions 21 in preventing any misorientation of the profiled members 10 and 11 relative to each other.

The head 15 of the eccentric 25 cannot be depressed in the direction of arrow 62 (FIG. 6) until and unless the marker 18 reassumes the position of FIG. 1, i.e., until and unless the eccentric 25 reassumes the neutral position of FIG. 1 so that the end face 47 of the leg 41 is in line with and can enter the aperture 55 in the rear wall member 36' of the housing 23. The reason is that the end face 47 of the leg 41 must move away from the protuberance 59 (preventing means) in order to enable the person in charge to manipulate the head 15 not unlike a pushbutton for the purpose of moving the entire eccentric 25 axially and into the internal space 12 of the profiled member 10.

In the absence of the lobe 84 and internal surface 86, the eccentric 25 can be returned to the starting position of FIG. 1 by using a tool in order to turn the eccentric in the direction of arrow 83 and beyond the angular position of FIG. 7, i.e., for the purpose of returning the maximum-eccentricity portion of the disc 16 to a position adjacent the front projection 35 of the coupling member 24. In the illustrated embodiment, the eccentric 25 must be rotated in a counterclockwise direction and back to the angular position of FIG. 1. The head 15 is then ready to be depressed into the internal space 12 preparatory (if necessary) to removal of the housing 23 from the profiled member 10.

The connector 20 is a slender part because the claws 22, 22' of the prongs 30, 30' need not perform large movements transversely of the symmetry plane 43. Thus, and as shown at 48 in FIG. 7, relatively small staggering of the claws 22, 22' in directions which are indicated by the arrows 69 and 69' suffices to move the end faces 73, 73' laterally beyond the slot-shaped inlet 67 so that the end faces 73, 73' can be caused to bear against the internal surface 68 of the selected wall 111. The character 48 further denotes the extent of overlap of the cam faces of the cams 29, 29' and the extent of movability of the followers 28, 28' transversely of the symmetry plane 43 in order to ensure that the claws 22, 22' cannot be retracted from the selected compartment 14 until the eccentric 25 is returned to the starting angular position of FIG. 1.

The rear end portion 40 of the coupling member 24 contributes little to the bulk of the connector 20. As can be seen in FIG. 5, the height 57 of the major portion of the looped end portion 40 (as measured in a direction from the wall member 36 toward the wall member 36') does not appreciably exceed the thickness of the plate-like portion 124 of the coupling member 24. The front side of the looped end portion 40 is or can be flush with the front side of the front wall 36 of the housing 23 (this can be seen in FIGS. 2A, 2B and 7). In FIG. 6, the front side of the looped end portion 40 is located behind the front side of the wall member 36. The looped end portion 40 can extend (at 65) rearwardly beyond the open inner end 51 of the housing 23, i.e., the housing need not confine the entire rear part of the coupling member 24.

The improved connector is susceptible of many additional modifications without departing from the spirit of the invention. For example, the surfaces of the followers 28, 28' need not be flat or substantially flat (i.e., the followers need not constitute elementary ramps); instead, the surfaces of the followers 28, 28' can constitute three-dimensional helical surfaces. This would merely necessitate a certain modification of the cams 29, 29' which would be provided with suitable guide slots or grooves for the respective followers. Furthermore, instead of moving substantially at right angles to the symmetry plane 43 (as indicated by the arrows 69, 69' of FIG. 7), the claws 22, 22' can be designed to perform more complex movements; for example, the heads 70, 70' of the claws could be caused to perform twisting movements toward and away from positions of engagement with the internal surface 68 of a selected wall 111. In other words, it is possible to select any one of numerous different ways and manners of moving the properly inserted claws 22, 22' or analogous claws toward and away from engagement with the internal surface 68 of a selected wall 111. The profiled member 10 can be moved up and down (arrow 65 in FIG. 1) relative to the profiled member 11 in response to loosening of the connector 20.

In contrast to many heretofore known proposals, the coupling member 24 of the improved connector is a one-piece profiled plate of suitable metallic material. Thus, its is not necessary to produce and thereupon assemble two separate prongs; all that is necessary is to properly slot a plate-like blank in order to provide the prongs 30, 30' and to properly shape these prongs in order to provide the claws 22, 22', the followers 28, 28', the elongated portions 74, 74' and the bent portions 72, 72'. The heads 70, 70' of the claws 22, 22' face in opposite directions so that their end faces 73, 73' can reliably engage a selected internal surface 68 at opposite sides of the respective inlet 67 and to couple the profiled members 10, 11 (or other suitable profiled members) to each other with a high degree of reliability while simultaneously permitting rapid and simple separation or uncoupling of the profiled members. Since the claws 22, 22' are mirror symmetrical to each other, their clamping and coupling action is highly reliable, even in the absence of the extensions 21 and of the tips 87, 87' of cams 29, 29'. When the claws 22, 22' are extracted from the selected compartment 14, they together constitute a flat composite body having a thickness (75) which is less than the width of an inlet 67 and being in register with the orienting extensions 21 of the housing 23. Since the claws 22, 22' are invariably located outside of the main section of the housing 23, the latter can constitute a flat component which merely receives the largely plate-like median and rear portions of the properly inserted coupling member 24. The claws 22, 22' can stand pronounced stresses when the connector 20 couples the profiled members 10, 11 to each other because these claws form part of prongs 30, 30' which are integral with each other, i.e., there is no danger of uncontrollable shifting of one prong relative to the other prong as is the case in certain conventional connectors wherein the prongs are parts of discrete plates or like bodies. The simplicity of the coupling member 24 is further enhanced due to the fact that the unslotted rear part of the coupling member must merely carry two projections (35, 38) which flank the disc 16 of the eccentric 25 and can transmit identical movements to each of the two prongs and hence to each of the two claws. The provision of a leaf spring 26 which is an integral part of the plate-like coupling member 24 also contributes to simplicity and reliability of the coupling member and of the entire connector. Thus, the head 15 of the properly inserted eccentric 25 is invariably biased into the window 60 of the profiled member 10 as soon as the coupling member 24 is properly installed in the housing 23 and the latter is properly installed in the internal space 12 of the profiled member 10 or another profiled member which is designed to receive the improved connector. Though the improved connector employs a coupling member with two discrete claws 22, 22', the confined portion of this coupling member is not more complex than that of a coupling member which carries a single calw or jaw. This is due to the fact that movements of the claws 22, 22' relative to each other need not be directly induced by the eccentric 25 but rather by the cams 29, 29' which can extend in part beyond the main section of the housing 23 and coact with the respective followers 28, 28' in automatic response to longitudinal movement of the generally plate-like median and rear parts of the one-piece coupling member in response to rotation of the eccentric 25 which engages the coupling member only at the plate-like portion 124. Since the hook-like portions of the claws 22, 22' need not be inserted into the housing 23, the assembly of the improved connector 20 is a simple and time-saving operation. All that is necessary is to manipulate the plate-like median and rear parts of the one-piece coupling member 24 in order to introduce the latter into or to effect its withdrawal from the housing 23.

The improved connector need not be provided with special guide means which are used in conventional twin-claw connectors to extend between the two discrete prongs, i.e., between two separately produced and separately installed prongs. All that is necessary is to provide the housing 23 with preferably integral cams 29, 29' which cooperate with the integral followers 28, 29' of the two prongs 30, 30' forming integral parts of a one-piece coupling member 24.

The feature that the prong 30' can be stressed in response to insertion into the housing 23 and engagement of its follower 28' with the cam 29' contributes to reliability of retention of the head 15 of the eccentric 25 in the window 60 of the front wall 100 of the profiled member 10. Thus, the stressed prong 30' cooperates with the stressed leaf spring 26 to ensure that the head 15 cannot accidentally leave the window 60 until and unless it is subjected to the action of a force in the direction of arrow 62.

As can be seen in FIG. 3, the combined thickness of the claws 22, 22' need not exceed the thickness of a single claw. This feature contributes significantly to the compactness and sleekness of the entire connector 20 without affecting the reliability of the coupling action. As mentioned above, the longer leg 71 of the claw 22 is coplanar with the shorter leg (part of 70') of the claw 22' and the longer leg 71' of the claw 22' is coplanar with the shorter leg (part of 70) of the claw 22 when the two claws are ready to be introduced into or to be withdrawn from a compartment 14. However, the combined thickness of the claws 22, 22' can be readily increased to that which is required for reliable engagement of a wall 111 (FIG. 7) by the simple expedient of shifting the coupling member 24 longitudinally to enable the followers 28, 28' to slide along the respective cams 29, 29' and to move the longer legs 71, 71' into a common plane whereby the hook-shaped head 70 extends from one side and the hook-shaped head 70' extends from the other side of such common plane. At the same time, the extensions 21 and the tips 87 and 87' of the cams 29, 29' properly position the front end 13 of the profiled member 10 relative to the profiled member 11 to thus ensure that the end faces 73 and 73' of the two jaws 22, 22' invariably engage the selected internal surface 68 at the opposite sides of the respective inlet 67.

FIG. 4 shows that the prongs 30 and 30' are located next to each other, i.e., that one of the prongs cannot interfere with movements of the other prong. The prongs 30, 30' should not and need not move nearer to or away from each other; however, the movements of the prong 30 and/or 30' transversely of the plane 43 are totally unobstructed and are determined closely by the innate tendency of these prongs to move to the positions of FIG. 3 and/or by the cams 29, 29' when the coupling member 24 is moved longitudinally (arrow 61 or 61') in response to rotation of the eccentric 25 about the axis 44.

Compactness (thinness) of the housing 23 is enhanced due to the fact that the cam faces of the cams 29, 29' cross each other in the region of the front end 13 of the profiled member 10.

It has been found that a profiled plate-like coupling member 24 which is made of relatively thin sheet metal stock can transmit and take up pronounced stresses when the profiled members 10, 11 are coupled to each other. This is attributable to the aforediscussed configuration of the claws 22, 22' and of the entire prongs 30, 30'. By utilizing relatively thin metallic sheet stock, one can achieve substantial savings in material of the coupling member without unduly affecting the reliability of the coupling action. The extensions 21 of the housing 23 and the tips 87, 87' of the cams 29, 29' ensure that the claws 22, 22' and the entire prongs 30, 30' are not subjected to pronounced twisting and similar stresses, i.e., the extensions 21 and the tips 87, 87' take over the centering and orienting of the connector 20 and profiled member 10 relative to the profiled member 11. Therefore, a coupling member 24 which is made of relatively thin sheet metal stock suffices because it need not carry out any orienting function but merely holds the profiled member 10 against movement away from the adjacent wall 111 of the profiled member 11.

The projection 38 (i.e., the leg 41 and the entire looped rear end portion 40 of the coupling member 24) could be replaced with a much simpler projection behind the disc 16, i.e., diametrically opposite the projection 35. However, the illustrated projection 38 (as part of the leg 41 of the looped rear end portion 40) is preferred at this time because it brings about a number of important advantages. Thus, the projection 38 is highly unlikely to be disengaged from the disc 16 while the eccentric 25 is caused to rotate in the direction of arrow 83, i.e., while the eccentric moves the coupling member 24 relative to the housing 23 in the direction of arrow 61. During such rotation of the eccentric 25, the coupling member 24 must transmit and stand very pronounced stresses, especially during and after the final stage of movement of the end faces 73, 73' of the claws 22, 22' into engagement with the adjacent internal surface 68 of a wall 111. Were the projection 38 replaced by a simpler projection of the coupling member 24, any flaws in the material of the coupling member and/or even minor fatigue of the material of the coupling member could result in breakage, cracking, chipping and other undesirable phenomena which could affect the useful life of the coupling member. Looping of the rear end portion 40 of the coupling member 24 greatly enhances the strength of such portion and ensures that the disc 16 of the eccentric 25 is much less likely to damage or unduly deform the rear projection 38. The expenditures for additional material which is needed to make the looped end portion 40 are minimal in comparison with savings which are achieved by prolonging the useful life of the coupling member 24 and of the entire connector 20. The feature that the leg 41 is "threaded" thorugh the opening 33 of the plate-like portion 124 of the coupling member 24 also contributes to stability and longer useful life of the coupling member. Thus, if and when necessary, the width of the clearance 54 is reduced to zero so that the leg 41 actually bears against the internal surface 45 in the opening 33 at the locus behind the disc 16 of the eccentric 25. The stability of the rear projection 38 is increased enormously as soon as the width of the clearance 54 is reduced to zero, i.e., as soon as the leg 41 actually bears against the adjacent portion of the upper horizontal leg 43 of the looped rear end portion 40 (as seen in FIG. 3). Such enormous increase in stability of the rear projection 38 (by the simple expedient of making the leg 41 flexible and hence movable all the way into actual contact with the internal surface 45) can be achieved even if the plate-like coupling member 24 is relatively thin.

The opening 33 need not be machined into or otherwise formed in the plate-like portion 124 for the sole purpose of permitting passage of the leg 41; this opening is necessary for the eccentric 25.

The protuberance 59 constitutes an optional but desirable and highly useful component of the improved connector. This protuberance ensures proper guidance of the coupling member 24 during introduction into the housing 23 and thereupon prevents unintentional retraction of the entire eccentric 25 into the internal space 12 of the profiled member 10. The leg 41 cooperates with the protuberance 59 (preventing means) to ensure that the projection 38 cannot slip off the disc 16 in a direction toward the rear wall member 36' of the housing 23 during introduction of the coupling member 24 into the housing.

In the absence of any undertaking to the contrary, accidental or unintentional depression of the entire eccentric 25 into the internal space 12 of the profiled member 10 could take place during rotation of the eccentric in or counter to the direction of arrow 83. Thus, when the working end of a screwdriver or a like tool is introduced into the recess 19 in the front end face of the head 15, at least a certain pressure in the direction of arrow 62 is normally applied in order to maintain the working end in the recess 19. The person in charge could accidentally press the head 15 in the direction of arrow 62 with a force which would suffice to expel the head 15 inwardly beyond the window 60 so that the housing 23 would be free to move longitudinally of and within the internal space 12. This could result in jamming of the coupling member 24 whereby the operator would gain the impression that the coupling member has already assumed the position of FIG. 7 in which the end faces 73, 73' of the claws 22, 22' bear against the internal surface 68 of the adjacent wall 111. The connection between the profiled members 10, 11 would be unstable which could lead to accidents, e.g., when the profiled members form part of a scaffolding, of a skeleton frame which supports a roof, or of any other structure which employs or can employ separable profiled members. Since a very small longitudinal movement of the coupling member 24 relative to the housing 23 suffices to move the end face 47 of the leg 41 out of exact alignment with the aperture 55, the protuberance 59 becomes effective and prevents any movements of the looped rear end portion 40 toward the rear wall member 36' of the housing 23.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A connector for separably coupling a first profiled member, wherein a wall has an internal surface confronting an internal compartment and an inlet affording access to the compartment, with a second profiled member having a window, an internal space and an open end affording access to the internal space, comprising an elongated hollow housing which is insertable into and withdrawable from the internal space by way of the open end of the second profiled member; a single coupling member constituting a profiled plate longitudinally movably received in said housing and having a front part consisting of elongated first and second prongs having claws located outside of said housing and being insertable into the compartment of the first profiled member to engage the internal surface at opposite sides of the inlet; means for moving said coupling member relative to said housing in a predetermined direction to draw said claws toward the interior of said housing and to thereby urge the claws against the internal surface of the wall of the first profiled member, said moving means including an eccentric which is rotatably mounted in said housing and in a rear part of said coupling member and includes a portion extending into the window of the second profiled member and being accessible from the exterior of the second profiled member; means for yieldably biasing said portion of said eccentric into the window of the second profiled member, said biasing means being provided on said rear part; and cam and follower means provided on said housing and on said prongs and being operative to stagger said claws relative to each other in response to movement of said coupling member in said direction.

2. The connector of claim 1, wherein said plate has an elongated slot between said prongs and said slot has a rear end portion remote from said claws and adjacent said eccentric, said plate further having projections flanking and being engageable by said eccentric to move said coupling member in said predetermined direction in response to rotation of said eccentric to a first angular position and to move said coupling member counter to said predetermined direction in response to rotation of said eccentric to a second angular position.

3. The connector of claim 1, wherein said claws are similar.

4. The connector of claim 1, wherein said claws are substantial mirror images of each other with reference to a plane which is normal to the axis of rotation of said eccentric.

5. The connector of claim 4 for separably coupling a first profiled member having a wall with an inlet of predetermined width, wherein said claws are movable relative to each other transversely of said plane between first positions in which the claws are insertable into and extractable from the compartment by way of the inlet in the wall of the first profiled member, and staggered second positions in which the claws engage the internal surface of the wall at opposite sides of the inlet, the movement of said claws to said staggered positions being effected by said cam and follower means in response to rotation of said eccentric in a direction to move said coupling member relative to said housing in said predetermined direction.

6. The connector of claim 5, wherein said claws comprise shanks at opposite sides of said plane and hook-shaped heads which are aligned with each other in the first positions of said claws.

7. The connector of claim 6, wherein said follower means include first and second followers on the respective prongs, said followers crossing each other adjacent the respective claws, said prongs further including elongated portions and said followers being disposed between the claws and the elongated portions of the respective prongs, said elongated portions being substantially mirror symmetrical to each other with reference to said plane.

8. The connector of claim 7, wherein said coupling member further comprises a projection adjacent said eccentric and each of said prongs further comprises a bent portion between said projection and the respective elongated portion.

9. The connector of claim 1, wherein said follower means have mutually inclined surfaces on said prongs and said cam means have complementary mutually inclined cam faces on said housing.

10. The connector of claim 9, wherein said cam faces have portions disposed in planes which cross each other.

11. The connector of claim 10, wherein said portions of said cam faces are slightly convex, said prongs further comprising elongated portions and said claws having shanks, each of said convex portions being engaged by the respective shank in response to movement of said coupling member in said predetermined direction and by the respective elongated portion in response to movement of said coupling member in a second direction counter to said predetermined direction.

12. The connector of claim 1 for separably coupling a first profiled member having a wall with an inlet of predetermined width, wherein each of said claws is substantially U-shaped and has a thickness which at most equals said predetermined width, each of said U-shaped claws having a first leg rigid with the respective follower means and a second leg, said claws being movable relative to each other between first positions in which the first and second legs of one of said claws are respectively coplanar with the second and first legs of the other of said claws and the claws are free to enter or leave the compartment by way of the inlet in the wall of the first profiled member, and staggered second positions in which the first leg of one of said claws is substantially coplanar with the first leg of the other of said claws so that said claws are prevented from leaving the compartment of the first frame member.

13. The connector of claim 1, wherein said housing comprises two coplanar extensions flanking said claws and being movable into and from the compartment through the inlet in the wall of the first profiled member.

14. The connector of claim 13, wherein said housing includes a main section having an open end, said cam means being disposed between said extensions and projecting outwardly beyond the open end of said main section.

15. The connector of claim 1, wherein said means for biasing said portion of said eccentric into the window of the second profiled member forms part of said coupling member.

16. The connector of claim 15, wherein said coupling member has a slot between said prongs and said slot has a closed end portion remote from said claws, said biasing means comprising a leaf spring and said closed end portion having two branches flanking said leaf spring.

17. The connector of claim 16, wherein said leaf spring is elongated and extends from said moving means toward said claws.

18. A connector for separably coupling a first profiled member, wherein a wall has an internal surface confronting an internal compartment and an inlet affording access to the compartment, with a second profiled member having an internal space and an open end affording access to the internal space, comprising an elongated hollow housing which is insertable into and withdrawable from the internal space by way of the open end of the second profiled member; a single coupling member longitudinally movably received in said housing and including elongated first and second prongs having claws located outside of the housing and being insertable into the compartment of the first profiled member to engage the internal surface at opposite sides of the inlet; means for moving said coupling member relative to said housing in a predetermined direction to draw said claws toward the interior of said housing and to thereby urge the claws against the internal surface of the wall of the first profiled member, said moving means comprising an eccentric which is rotatably mounted in said housing and said coupling member having two projections flanking said eccentric, said projections including a first projection between said eccentric and said claws and said eccentric being disposed between said first projection and the other of said projections, said coupling member including a looped end portion remote from said claws and including said other projection; and cam and follower means provided on said housing and on said prongs and being operative to stagger said claws relative to each other in response to movement of said coupling member in said direction.

19. The connector of claim 18, wherein said looped end portion forms a substantially closed loop and includes a leg extending in substantial parallelism with the axis of rotation of said eccentric and including said other projection.

20. The connector of claim 19, wherein said coupling member includes a plate-like portion adjacent said eccentric and having an opening for a portion of said leg.

21. The connector of claim 20, wherein said eccentric includes a portion in said opening.

22. The connector of claim 20, wherein said coupling member has an internal surface bounding said opening adjacent said leg and said eccentric is rotatable in a direction to move said claws against the internal surface of the wall of the first profiled member and to simultaneously urge said leg toward the internal surface of said coupling member, said eccentric being further rotatable in a direction to move said claws away from the internal surface of the wall of the first profiled member through the medium of said one projection.

23. The connector of claim 20, wherein said plate-like portion of said coupling member has a first side and a second side, said leg extending transversely of said plate-like portion into said opening at one of said sides and from and beyond said opening at the other of said sides.

24. The connector of claim 23, wherein said leg is substantially straight and extends substantially at right angles to said plate-like portion.

25. The connector of claim 20 for coupling a second profiled member having a window in alignment with said eccentric, wherein said eccentric has a portion which is aligned with the window when said housing is inserted into the second coupling member, said eccentric being movable axially between an extended position in which said portion thereof is received in the window and a retracted position in which the entire eccentric is located in the internal space of the second profiled member to permit insertion of said housing into and removal of said housing from the second profiled member, and further comprising means for biasing said eccentric to said extended position, said eccentric being rotatable in a direction to move said claws against the internal surface of the wall of the first profiled member and in a direction to move said claws away from the internal surface of the wall of the first profiled member, said housing having means for preventing axial movement of said eccentric to retracted position while said claws bear against the internal surface of the wall of the first profiled member.

26. The connector of claim 25, wherein said looped end portion includes a component which is movable by said eccentric from a first position to a second position in response to rotation of said eccentric, said preventing means being adjacent said component in the second position of such component.

27. The connector of claim 26, wherein said component includes said leg and said leg is pivotable by said eccentric between said first and second positions thereof, said leg being substantially parallel to the axis of rotation of said eccentric and said preventing means being aligned with and preventing a movement of said leg in the axial direction of said eccentric away from the window in the second profiled member, said eccentric being arranged to share the movements of said leg in said axial direction.

28. The connector of claim 27, wherein said leg has an end face and said preventing means is adjacent said end face in the second position of said component.

29. The connector of claim 25, wherein said housing includes a wall member and said preventing means is part of said wall member.

30. The connector of claim 29, wherein said wall member has an aperture which is adjacent said preventing means, said component being aligned with and being free to enter said aperture in the first position thereof.

31. The connector of claim 25, wherein said housing has a wall member adjacent the window of the second profiled member in inserted position of said housing, said wall member having a front side confronting the window and said looped end portion having a front side which is substantially coplanar with the front side of said wall member when said claws engage the internal surface of the wall of the first profiled member.

32. The connector of claim 22, wherein said leg and said internal surface of said coupling member define a clearance at least when said claws are disengaged from the internal surface of the wall of the first profiled member.

33. The connector of claim 32, wherein said leg is elastic and undergoes elastic deformation in response to rotation of said eccentric in said first direction.

* * * * *